United States Patent [19]

Royle

[11] Patent Number: 5,176,098

[45] Date of Patent: Jan. 5, 1993

[54] RETRACTABLE WHEELS

[75] Inventor: David A. C. Royle, Darlington, United Kingdom

[73] Assignee: Cardox Limited, Darlington, United Kingdom

[21] Appl. No.: 607,359

[22] PCT Filed: Apr. 28, 1989

[86] PCT No.: PCT/GB89/00458

§ 371 Date: Oct. 31, 1990

§ 102(e) Date: Oct. 31, 1990

[87] PCT Pub. No.: WO89/10855

PCT Pub. Date: Nov. 16, 1989

[30] Foreign Application Priority Data

May 4, 1988 [GB] United Kingdom ............... 8810479

[51] Int. Cl.⁵ ............................................. B63C 13/00
[52] U.S. Cl. ..................................... 114/344; 114/270
[58] Field of Search ............... 114/343, 344, 270, 56, 114/57; 280/414.1, 414.2, 414.3, 414.5, 43, 43.17, 43.22

[56] References Cited

U.S. PATENT DOCUMENTS 2,231,710  2/1941  Ford .
3,236,324  2/1966  Levratto .
3,421,472  1/1969  Oberg .
3,755,835  9/1973  Boersig ............................... 114/344
3,755,838  9/1973  Dunagan .
3,858,260  1/1975  Hanser ................................ 114/344
4,008,679  2/1977  Bozzano ............................. 114/344

FOREIGN PATENT DOCUMENTS 2446734  8/1980  France .
2465603  3/1981  France .
9981  of 1910  United Kingdom .

Primary Examiner—Jesus D. Sotelo
Assistant Examiner—Stephen P. Anna
Attorney, Agent, or Firm—Wegner, Cantor, Mueller & Player

[57] ABSTRACT

A vehicle having a steerable wheel has a mechanism for retracting the wheel into a compartment in the vehicle. The mechanism comprises a pillar (23) mounted to the vehicle within the compartment at two spaced positions, preferably at the top and bottom of the pillar. A steering arm (26) fixed to the pillar is movable to rotate the pillar (23) about its own axis. A collar (22) is slidably mounted on the pillar (23) but rotatable with the pillar. The collar (22) carries wheel forks (21) on which a pair of wheels is mounted on stub axles. The wheels are turned by rotation of the collar as a result of the steering action on the pillar, and their height is altered by raising and lowering the position of the collar on the pillar. The mechanism is applicable for use in amphibious craft.

16 Claims, 4 Drawing Sheets

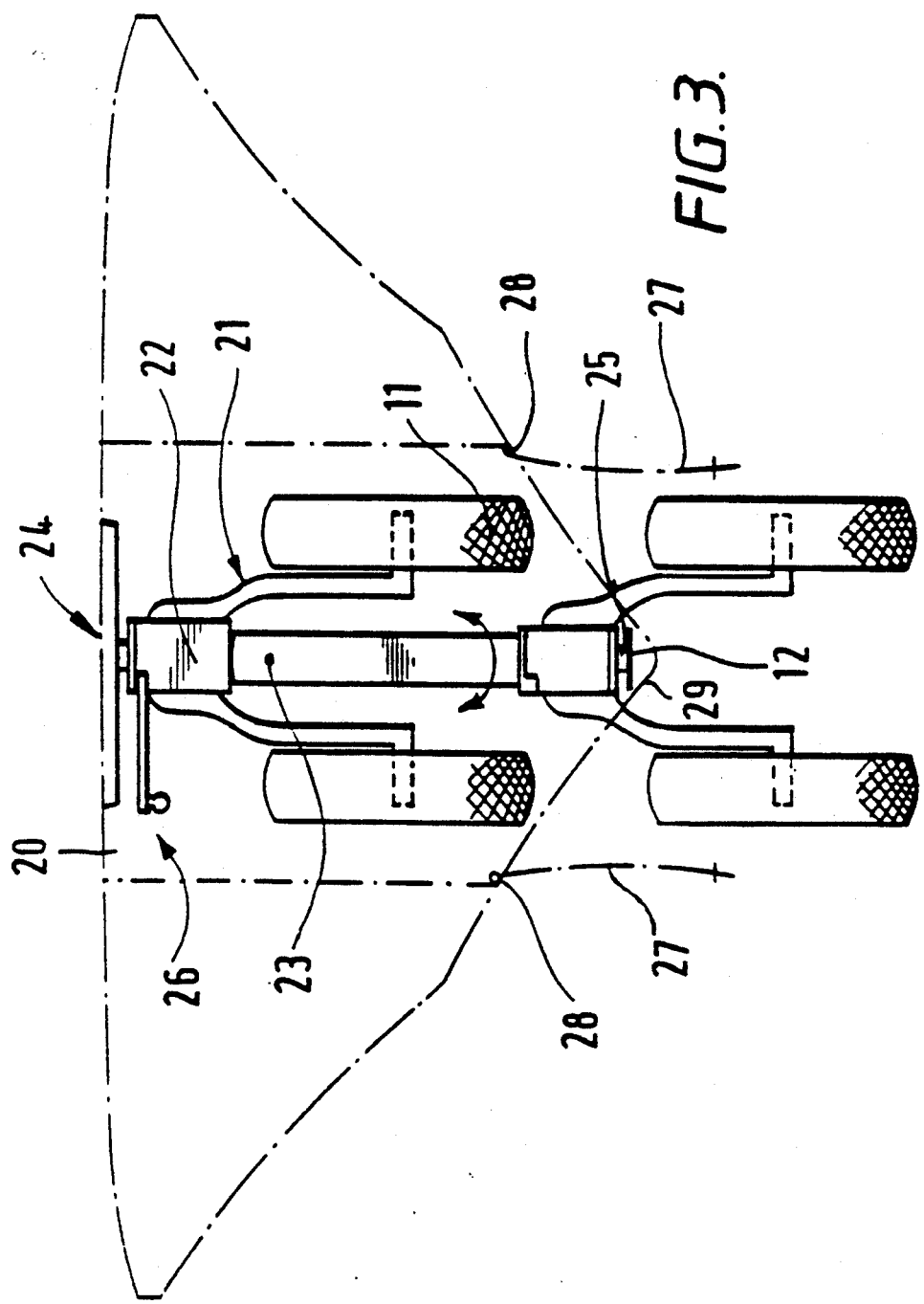

RETRACTABLE WHEELS

The present invention relates to retractable wheels and particularly but not exclusively to a steerable wheel for use in amphibious craft such as a boat adapted to be driven on land. In such a craft the wheel would need to be retractable or easily adjustable for height between a lowered position in which it would engage the ground for land use and a retracted position.

Whilst amphibious vehicles are not new, most are in the form of amphibious motor cars (or armoured vehicles). One of the main problems with this configuration is that the volume of the car is small in relation to its weight, consequently when in water the vehicle will be deeply immersed. Having little freeboard the vehicle can easily be swamped in any kind of rough water. There is also an insecurity for the occupants in being so low in the water. The design of a car is not appropriate for water travel and a speed of only approximately 5 mph is possible in use. They are nearly always cumbersome on land and sea, are very slow, and are often designed for military use.

If an amphibious craft is to perform well on water and at higher speeds it must have a hull profiled to make this possible. This will necessitate the provision of a larger movement of the wheel between the raised position for stowage and the lowered position for road use than has hitherto been catered for.

The object of the invention is to provide a retractable wheel design capable of being applied to provide such a wheel movement.

According to the present invention there is provided a vehicle having a steerable wheel and a mechanism for retracting the steerable wheel into a compartment in the vehicle, wherein the mechanism comprises a pillar pivotally mounted to the vehicle within the compartment, a steering arm connected to rotate the pillar about its own axis, a collar slidably mounted on the pillar but rotationally fixed relative thereto, the wheel being attached to the collar so that it can be raised and lowered in use by sliding the collar on the pillar and steered by movement of the steering arm to rotate the pillar.

Arrangement can be made for the wheels to be steered in any position of the collar on the pillar.

Preferably the pillar and collar are of cooperating non-circular section so that rotation of the pillar automatically moves the collar without the use of keyways, splines, or guides. Advantageously the collar supports a pair of wheels. In an amphibious craft these may be arranged one on each side of the longitudinal centre line of the craft. Usually the steerable wheel will be attached to the collar via wheel supports.

In one embodiment the orientation of the wheel supports is altered from an upright position when the wheel is in the lowered position to a substantially horizontal position when the wheel is raised for stowage.

The invention will now be described, by way of example, with reference to the accompanying drawings in which:

FIG. 3 is a schematic front section showing one embodiment of a front wheel retraction mechanism and FIGS. 4a, 4b, 4c, and 4d, are schematic partial views of a second retraction mechanism for the front wheels.

The drawings illustrate an amphibious craft in the form of a boat having a hull with a deep-V cross-section below the water line. The boat is convertible so as to provide a means of driving the boat on land on wheels. The operation of the boat in water is substantially unimpaired other than due to the extra weight carried. The profile is unaltered and the drag is not substantially increased.

Figure 1:
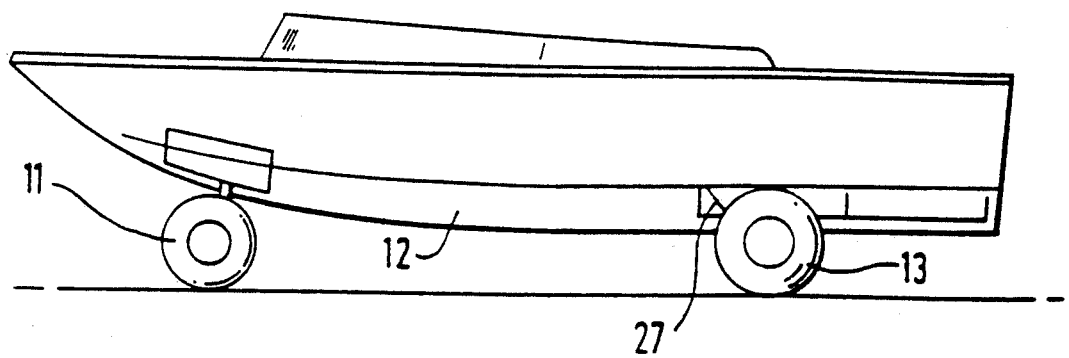
FIG. 1 is a side view of an amphibious craft according to the invention having a profile with a deep-V configuration.
Figure 2:
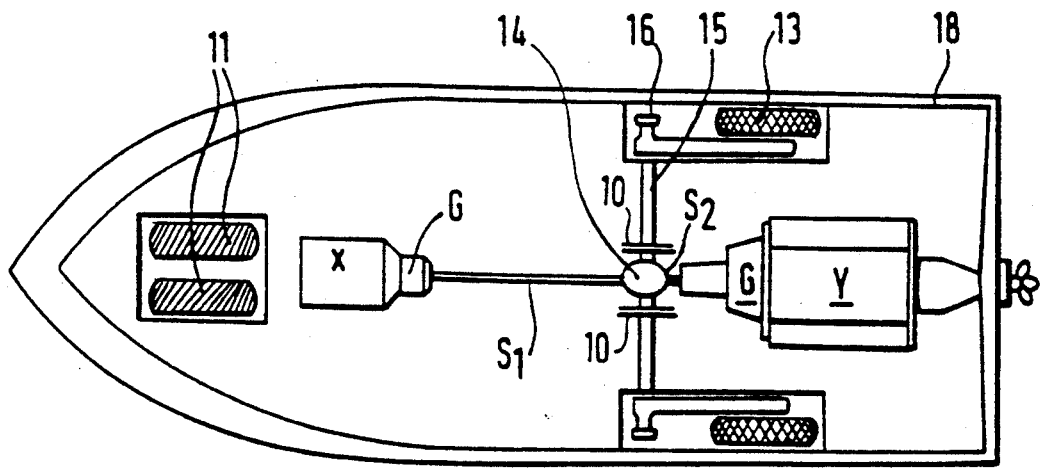
FIG. 2 is a schematic section view in plan of the craft of FIG. 1

The boat in water is driven either by a large inboard motor normally in an aft position (such as shown at Y in FIG. 2) or by an outboard motor (not shown). Where an inboard motor is used it could also power the wheels for use of the craft on land. If an outboard motor is used on the boat, a secondary motor such as that shown at X would have to be provided to drive the wheels. In either case the boat wheels are driven in a manner similar to those on an automobile through a gear box G, a shaft 8, a differential 14 and a shaft 15. Inboard brakes 10 would also be provided.

The wheels on the boat comprise a pair of steerable forward or front wheels 11 designed to carry one third of the weight of the boat and set one either side of a keel 12 in the bow of the boat; and two drivable rear wheels 13 designed to carry two thirds of the weight of the bolt. The rear wheels 13 are positioned on opposed sides of the boat inside the line of the hull. The use of a pair of forward wheels leaves the keel undisturbed and so does not interfere with the strength of the boat structure.

The operation of the rear wheels is described and claimed in my co-pending PCT application No 89/10854 of the same date.

The steerable wheels 11 are supported by stub axles 21a mounted on a forked wheel support or "forks" 21. The upper end of the forked wheel support 21 is in the form of a square-sectioned collar 22. The collar 22 is slidably mounted on a square-sectioned, rectangular or other cornered section central pillar 23, the upper and lower ends of which pillar are pivotally mounted to the boat structure at 24 and 25. The pillar 23 is pivoted to steer the craft on land by movement of a steering arm 26 which action turns the collar 22 to turn the wheels 11. When the wheels are in the lowered position they can be held in position by security locks (not shown). The wheels are raised and lowered by a hydraulic ram (not shown in FIG. 3) which operates between respective brackets on the pillar and collar. The pillar, the collar and the ram form elements of a retraction mechanism for the wheels. In the raised position the wheels are stowed in a compartment 20 in the bow of the boat. The fitting of the compartment to the hull is entirely watertight so that water entering the compartment does not enter the boat. When the compartment is closed the profile of the boat is maintained by two doors 27 hinged at 28 which are closed against the bottom 29 of the boat, but need not be watertight. The top of the compartment is situated well above the water line and therefore any water seeping past the doors will remain in the compartment at a level equal to or below the water level outside the hull. The actual portion of the bottom of the boat that is cut away to form the doors 27 is important as sufficient room must be left for the wheel "forks" 21 to turn the wheels in the lowered position without collision or interference with or from the boat structure.

The arrangement of the steering arm above the water line of the boat makes for a simpler mechanism. Moreover with this sliding collar arrangement the wheels can be steered successfully in any position of the collar on the pillar. The steering for the boat is not moveable with the wheel but instead stays in one place.

In some boats there may not be sufficient room for a large steerable wheel compartment with the wheel "forks" 21 stored substantially vertically. FIG. 4 shows an alternative arrangement to cater for storage in a smaller deck to keel depth. Each drawing shows only part of the arrangement and it may be necessary to refer to FIG. 3 to understand the whole.

Figure 4A:
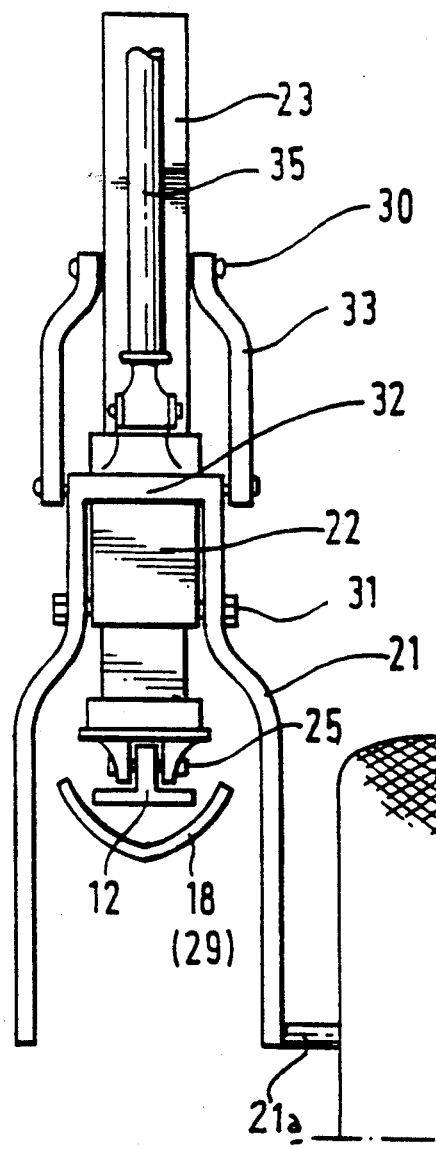

FIG. 4a is a front view of the lower part of the mechanism showing the wheel forks 21 and one wheel 11. The wheel "forks" 21 are pivotally mounted at 31 to the collar 22 and are connected together by a bar 32. Respective bars 33 are pivotally mounted to opposed sides of the bar 32 at one end and at the other end 30 are pivotally mounted to opposed sides of the central pillar 23. A shoulder 34 on the collar 22 provides a lower mounting point for the ram now shown at 35 and the pivotal mounting 25 of the central pillar 23 to the keel 12 is also shown. If desired the section of the keel on which the pillar is mounted can be removed and replaced by an equivalent section of different and preferably stronger material from the rest of the keel, such as a casting or fabrication. The movement of the collar up and down the pillar in either embodiment can equally be controlled by any suitable alternative to hydraulic rams, such as screw, cables, chain, compressed air etc. Slots can be machined into the pillar to allow the moving force to be applied from inside if desired for example by an internal ball screw.

Figure 4B:
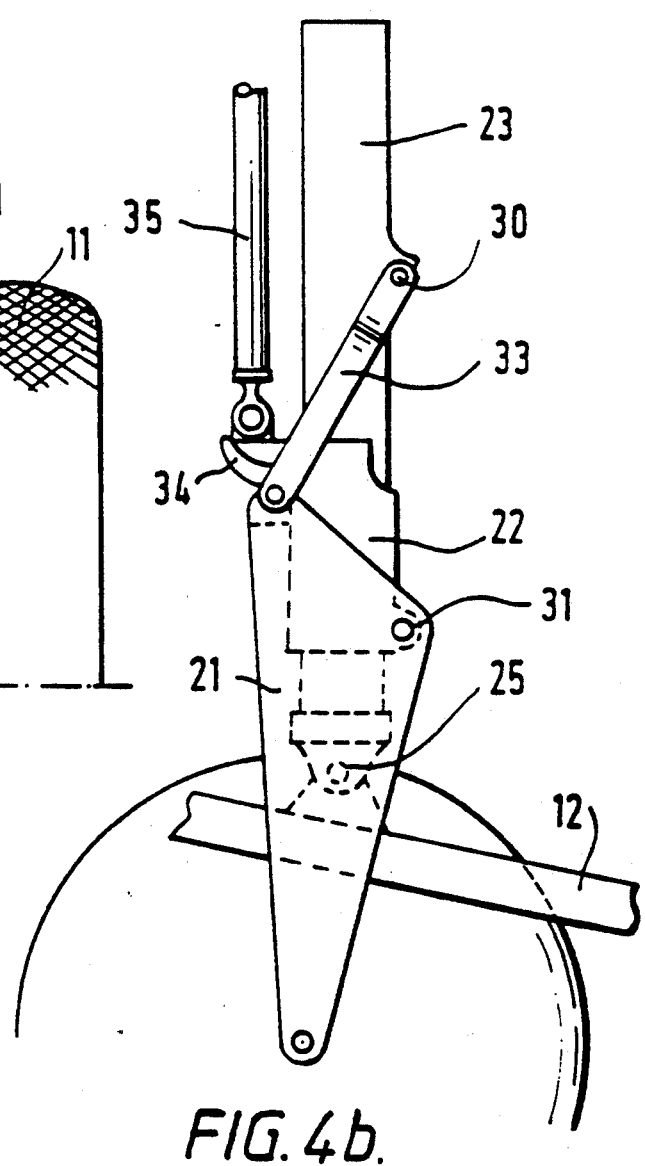

FIG. 4b is a side view of FIG. 4a showing the central area of the mechanism with the wheels in the lowered position. It will be noted that as the ram 35 draws the collar 22 up until it abuts the pivotal mounting 30 the pivoted bars operate as a lever mechanism to lift the wheels until the "forks" 21 lie along the line of the boat substantially horizontally.

Figure 4C:
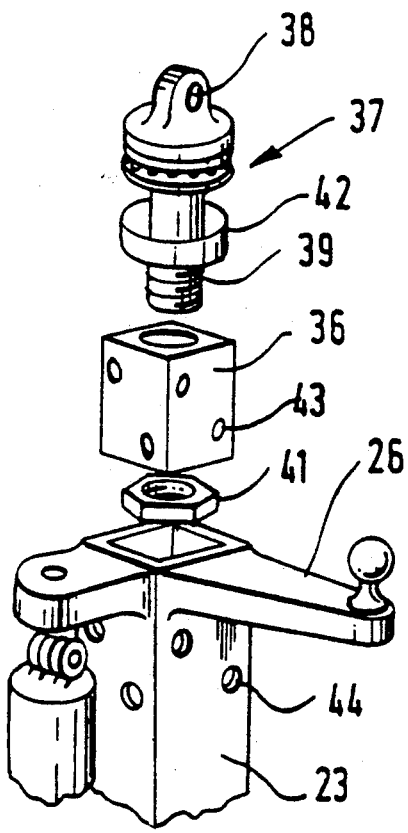
Figure 4D:
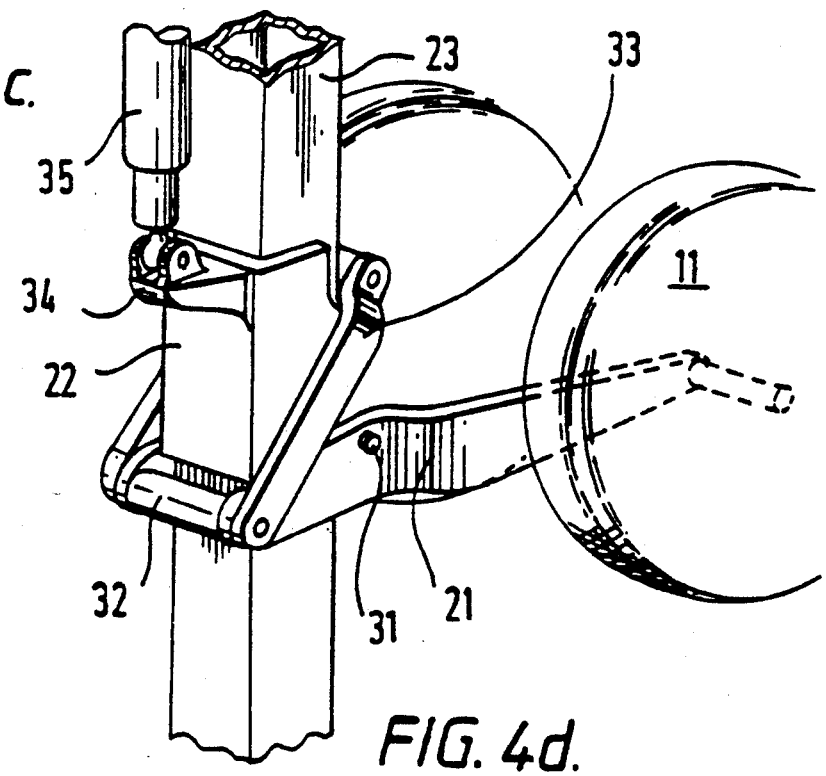

FIG. 4c illustrates the connection of the central pillar 23 at the upper end of the pillar. The same pivotal connection and height adjustment pieces and fillers may be used at the lower pivotal mounting 25. The connection comprises a sub-assembly of a mounting block 36, a thrust bearing 37 and a nut 41. The upper race of the thrust bearing 37 has a pivot mounting 38 for attachment to the deck. The lower race of the bearing 38 is located by a threaded bolt portion 39. The bolt 39 is threaded through the centre of the mounting block 36 and is screw threaded into the nut 41. This sub-assembly is then fitted into the top end of the pillar 23 to which it is bolted via holes 43 in the block and 44 in the pillar. The length of the pillar 23 is selected in accordance with the distance between the deck and the keel on any particular boat and any fine adjustment to the fitting is achieved using shims (not shown).

In each case the hydraulic ram or rams are connected to a hydraulic pump powered by the motor X or Y or an electrically powered pump. The hydraulic ram 35 is operable from a remote position in the cockpit of the vehicle to raise or lower the wheels by the required amount instantly. The steering is also operable by remote control from the cockpit, the wheels being steerable throughout the height range. The steering arm 26 and levers connecting the steering arm to the remote steering mechanism in the cockpit have constant geometry with the angles only changing in one plane. If the craft is not expected to travel at more than 25 miles per hour on land, floatation tires can be used absolving the need for suspension. If a greater land speed is required then higher pressure road tires will be needed and some springing or other suspension.

Both embodiments could accommodate suspension. This would be interposed between the sliding collar and the mechanism for moving the collar up and down the pillar. The front wheel could be driven by a motor mounted on the collar or the pillar, or remote from the pillar through chains or shafts to the wheels. Hydraulic drive to the wheels themselves could be used. Although the retractable wheels are described in relation to an amphibious craft it will be appreciated that the same mechanism could be used in other applications.

I claim:

1. A vehicle having a steerable wheel or pair of wheels and a mechanism for retracting the steerable wheel or pair of wheels into a compartment in the vehicle, wherein the mechanism comprises a pillar pivotally mounted to the vehicle within the compartment, a steering arm connected to rotate the pillar about its own axis, a collar slidably mounted on the pillar but rotationally fixed relative thereto, the steerable wheel or pair of wheels being attached to the collar so that the steerable wheel or pair of wheels can be raised and lowered in use by sliding the collar on the pillar and steered by movement of the steering arm to rotate the pillar.

2. A vehicle according to claim 1 wherein the pillar and collar are of cooperating noncircular section so that rotation of the pillar automatically moves the collar about the same axis.

3. A vehicle according to claim 1 in which the pillar has upper and lower ends, wherein the pillar is mounted to the vehicle adjacent the upper and lower ends of the pillar.

4. A vehicle according to claim 3 wherein the upper and lower mounting of the pillar to the vehicle comprise pivotal mountings to the top and bottom of the pillar about transverse axes.

5. A vehicle according to claim 1 wherein the vehicle is an amphibious craft in the shape of a boat having a hull with a hull profile.

6. A vehicle according to claim 5 wherein the hull profile has a deep-V configuration.

7. A vehicle according to claim 6 wherein the collar supports a pair of steerable wheels disposed on opposite sides of the longitudinal centre line of the boat.

8. A vehicle according to claim 7 wherein said wheels are mounted on respective stub axles carried by respective forks of a forked wheel support attached to the collar.

9. A vehicle according to claim 8 wherein the wheel support is attached to the collar via a first pivotal mounting and the mechanism includes a system of linkages which operate to raise and lower the wheels by converting a sliding action of the collar on the pillar to a pivotal movement of the wheel support with respect to the pillar about the pivotal mounting.

10. A vehicle according to claim 9 wherein the system of linkages includes a link between a second pivotal mounting point on the pillar and a third pivotal mounting point on the wheel support spaced from the first pivotal mounting.

11. A vehicle according to claim 9 wherein the wheels are lowered and retracted by an extension/contraction device connected between the pillar and the collar.

12. A vehicle according to claim 5 wherein the steering arm is fixed to the upper end of the pillar.

13. A vehicle according to claim 5 wherein the collar supports a pair of steerable wheels disposed on opposite sides of the longitudinal centre line of the boat.

14. A vehicle according to claim 13 wherein the wheel support is attached to the collar va a first pivotal mounting and the mechanism includes a system of linkages which operate to raise and lower the wheels by converting a sliding action of the collar on the pillar a pivotal movement of the wheel support with respect to the pillar about the pivotal mounting.

15. A vehicle according to claim 14 wherein the system of linkages includes a link between a second pivotal mounting point on the pillar and a third pivotal mounting point on the wheel support spaced from the first pivotal mounting.

16. A vehicle according to claim 14 wherein the wheels are lowered and retracted by an extension/contraction device connected between the pillar and the collar.

* * * * *